(12) United States Patent
Sun et al.

(10) Patent No.: US 7,008,551 B2
(45) Date of Patent: Mar. 7, 2006

(54) LOW LOSS OPTICAL WAVEGUIDE DEVICE

(75) Inventors: C. Jacob Sun, Saratoga, CA (US); James K. Eu, Fremont, CA (US)

(73) Assignee: Andevices, Inc., Fremont, CA (US)

( * ) Notice: Subject to any disclaimer, the term of this patent is extended or adjusted under 35 U.S.C. 154(b) by 299 days.

(21) Appl. No.: 10/427,558

(22) Filed: Apr. 30, 2003

(65) Prior Publication Data

US 2003/0201243 A1    Oct. 30, 2003

Related U.S. Application Data

(63) Continuation of application No. 09/766,026, filed on Jan. 18, 2001, now abandoned.

(51) Int. Cl.
*B29D 11/00* (2006.01)
*C23F 1/00* (2006.01)

(52) U.S. Cl. .............................. 216/24; 216/51; 216/58; 438/689; 438/715; 385/14; 427/255.29

(58) Field of Classification Search .................. 216/24, 216/51, 58; 385/14; 438/689, 715; 427/255.29
See application file for complete search history.

(56) References Cited

U.S. PATENT DOCUMENTS 5,646,075 A * 7/1997 Thakur et al. ..... 148/DIG. 133
5,648,175 A * 7/1997 Russell et al. ................ 118/50
5,738,798 A * 4/1998 Leonard ........................ 216/24
5,855,957 A * 1/1999 Yuan ...................... 427/255.29
6,037,268 A * 3/2000 Dautartas et al. ............. 216/24
6,137,176 A * 10/2000 Morozumi et al. ......... 257/750

* cited by examiner

*Primary Examiner*—Shamim Ahmed
(74) *Attorney, Agent, or Firm*—DLA Piper Rudnick Gray Cary US LLP

(57) ABSTRACT

A method for forming optical devices on-planar substrates, as well as optical devices formed by the method are described. The method uses a linear injection APCVD process to form optical waveguide devices on planar substrates. The method is performed at approximately atmospheric pressure. According to the method, a wafer with a lower cladding layer already formed by either CVD or oxidation is placed on a conveyer, which may include a heating element. The heated wafer is transported underneath a linear injector such that the chemicals from the linear injector react on the wafer surface to form a core layer. After the core layer is formed, photoresist is spun on the surface of the wafer, and then standard lithography is used to pattern the optical devices. Next, reactive ion etching (RIE) is used to form waveguide lines. The remaining photoresist is then removed. An upper cladding layer is formed to substantially cover the core regions. The upper cladding layer may be formed in a manner similar to that used to form the core layer. The refractive index of the upper cladding layer is generally the same as that of the lower cladding layer. The refractive index of the core layer is generally 0.2% to 2% greater than that of the upper and lower cladding layers.

17 Claims, 4 Drawing Sheets

LOW LOSS OPTICAL WAVEGUIDE DEVICE

This a continuation of application Ser. No. 09/766,026, filed Jan. 18, 2001, now abandoned, which is incorporated herein by reference.

BACKGROUND OF THE INVENTION

Optical waveguide devices formed on planar substrates have become important elements for various optical network applications, including multiplexer and demultiplexer in dense wavelength division multiplexing (DWDM) systems and components in passive optical networks (PON). This technology allows multiple functional units to be integrated on a single substrate.

The key to forming optical waveguide devices on a planar substrate is the deposition process. In order to produce high quality devices, the deposition process must produce stable films that demonstrate low optical loss. Ideally, the deposition method should provide for high throughput as well as high quality devices.

Various methods have been used to form optical waveguide devices on a planar substrate. For example, halide materials have been used to form device layers. However, this method requires special handling of the corrosive halide materials. Another method that has been used is deposition at sub-atmospheric pressure; for example, sub-atmospheric plasma-enhanced chemical vapor deposition (PECVD). However, this method provides a lower deposition rate than the current invention. A third method that has been used is atmospheric pressure chemical vapor deposition (APCVD) using a showerhead configuration. However, this method provides less than optimal wafer-to-wafer uniformity than does the current invention.

SUMMARY OF THE INVENTION

The current invention provides a method for forming optical waveguide devices on a planar substrate that does not involve using corrosive halide materials. The method provides an improved throughput over reduced pressure methods and better wafer-to-wafer uniformity than showerhead APCVD methods.

The current invention uses a linear injection APCVD method to form layers for optical waveguide devices on planar substrates. A linear injector apparatus that can be used to perform the method of the current invention is described in U.S. Pat. No. 5,855,957 to Yuan, which is hereby incorporated by reference.

The current invention does not use corrosive halide materials; instead it uses primarily metal-organic materials, such as tetraethylorthosilicate (TEOS), trimethylphosphite (TMPi), triethylphosphate (TEPo), trimethylborate (TMB), triethylborate (TEB), and tetramethyloxygermane (TMOG).

The process is performed at approximately atmospheric pressure and therefore provides a higher deposition rate than reduced pressure processes. For example, a deposition rate of 0.6 µm/min has been obtained with the process. Additionally, the linear injector method enables the user to obtain a very uniform deposition. For example, the method has been used to produce layers with refractive index uniformity of within ±0.0002, while layer thickness has been controlled to be uniform to within ±4%.

According to the method, a wafer with a lower cladding layer already formed by either CVD or oxidation is placed on a conveyer; for example, a conveyer belt transport device. The conveyer may also include a heating element to heat the wafer, although other means may be used to heat the wafer. If the wafer includes a quartz glass or fused silica substrate, the substrate may act as the lower cladding layer.

The linear injector transports materials to the wafer for formation of the subsequent core and upper cladding layers. Materials used to form the core and upper cladding layers include TEOS, TMPi, TEPo, TMB, TEB, and TMOG. Oxidizing agents, for example an $O_3/O_2$ mixture, are also used to form the core and upper cladding layers.

In order to form the core layer, TEOS is used as a source gas. The core layer may include dopants; for example, $P_2O_5$, $GeO_2$, and $TiO_2$ may be used as dopants for the core layer. The dopants may increase the refractive index of the core layer as needed to provide the necessary optical properties for the resulting device. The conveyer transports the heated wafer underneath the linear injector such that the chemicals from the linear injector react on the wafer surface to form the core layer.

After the core layer is formed, photoresist is spun on the surface of the wafer, and standard lithography is used to pattern the optical devices. Next, reactive ion etching (RIE) is used to form core regions. The remaining photoresist is then removed.

After the photoresist is removed, the upper cladding layer is formed. The upper cladding layer may be formed in a manner similar to that used to form the core layer. The upper cladding layer may include dopants; for example, $P_2O_5$ or $B_2O_3$ may be used as dopants in the upper cladding layer. The upper cladding dopants may be used to make the glass flow better to fill in between the etched core regions. The upper cladding layer substantially covers the core regions. The refractive index of the upper cladding layer is generally the same as that of the lower cladding layer. The refractive index of the core layer is generally 0.2% to 2% greater than that of the upper and lower cladding layers.

The current invention also includes optical waveguide devices formed using the described method. For example, it includes Array Waveguide Grating (AWG) devices formed using the method.

This invention can be more fully understood in light of the following detailed description taken together with the accompanying figures. Like elements are designated by like reference numerals throughout the figures.

DETAILED DESCRIPTION OF THE INVENTION

Figure 1:
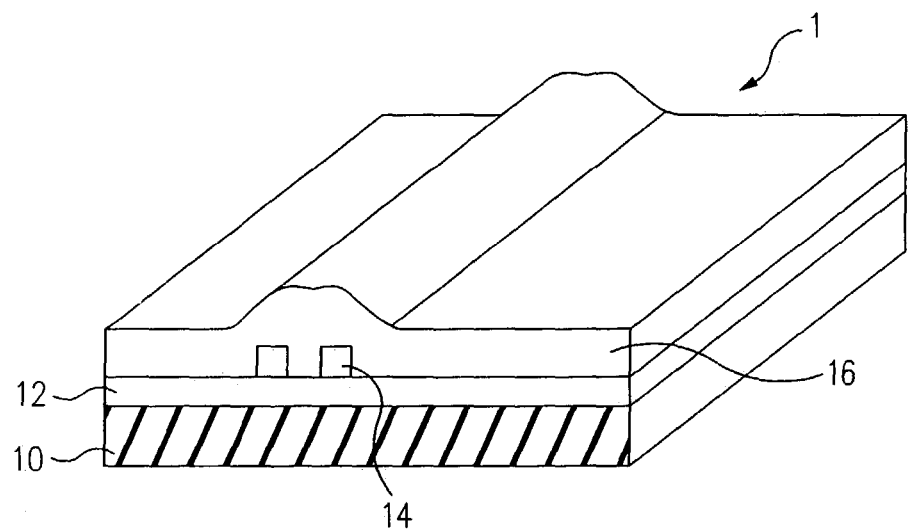
FIG. 1 is a cross sectional view of an optical waveguide device.

An optical waveguide device formed on a planar substrate includes three layers formed on the substrate. Referring to FIG. 1, an optical waveguide device 1 is formed on a planar substrate 10. The substrate 10 may be the wafer itself or may be a layer formed on the surface of the wafer. Lower cladding layer 12 is doped or pure $SiO_2$. It may be formed by CVD or by oxidation. It may be formed using the linear injector APCVD method of the current invention using pure or doped TEOS. The total dopant level for the lower cladding layer 12 is typically 0–10 wt %. If the substrate 10 is quartz glass or fused silica, the substrate itself may act as the lower cladding layer. The thickness of lower cladding layer 12 is generally between 2–20 µm.

Core 14 is pure or doped $SiO_2$. Examples of dopants include $P_2O_5$, $GeO_2$, and $TiO_2$. The core dopants increase the material's refractive index in order to obtain the required optical properties of the completed device. The refractive index of the core is normally 0.2% to 2% greater than that of the cladding layers. The total dopant level for the core layer is typically 1–20 wt % and the film thickness is typically 1–10 µm.

The upper cladding layer 16 is pure or doped $SiO_2$. For example, $P_2O_5$ or $B_2O_3$ may be used as dopants in the upper cladding layer. The refractive index of the upper cladding layer 16 is generally matched to the refractive index of the lower cladding layer 12. The total dopant level for the upper cladding layer 16 is generally 0–15 wt % and the thickness is typically 2–20 µm.

Figure 2:
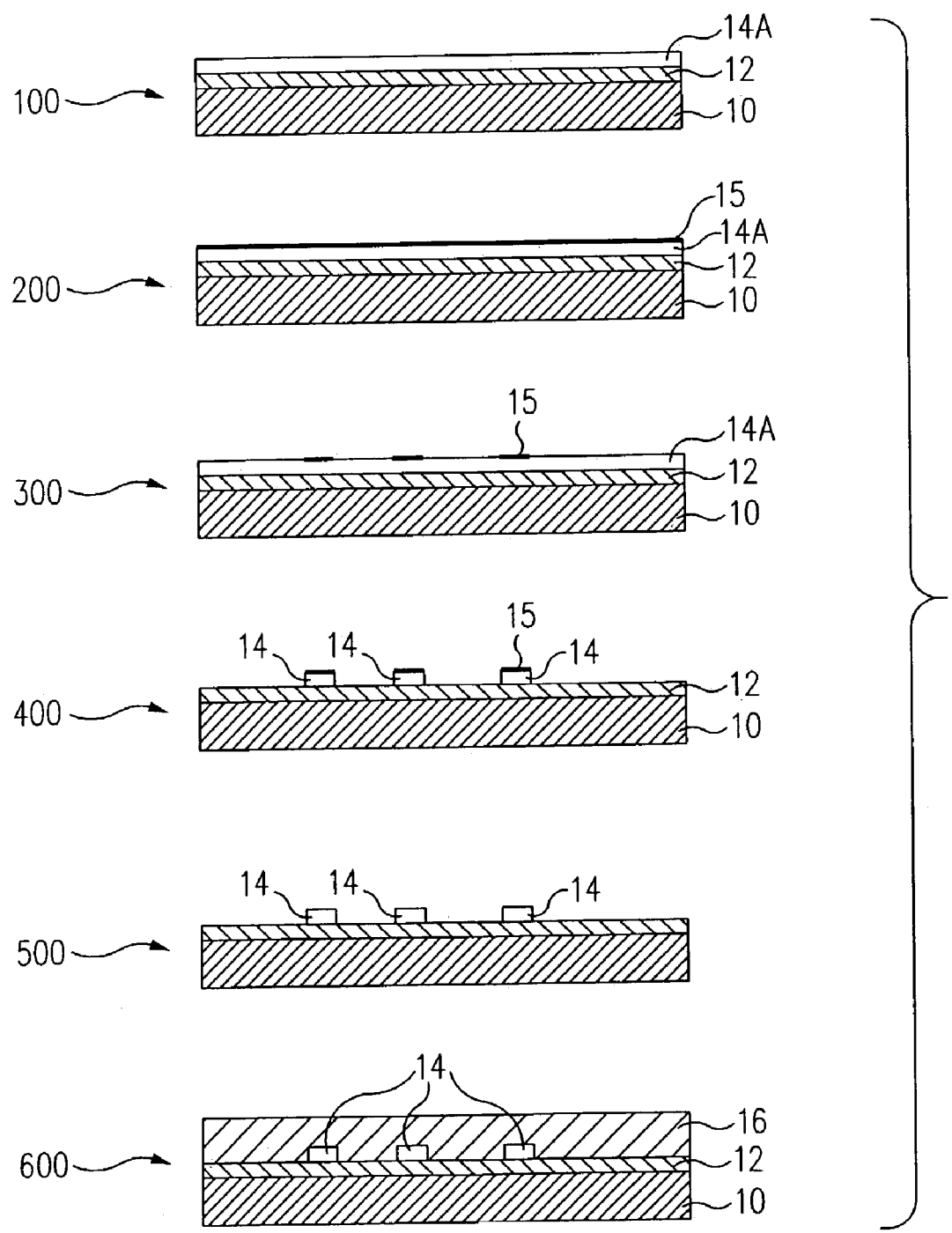
FIG. 2 provides a process flow diagram.

FIG. 2 illustrates the process of the current invention. In step 100, the lower cladding layer 12 has already been formed by CVD or oxidation on substrate 10. The core layer 14A is formed on top of the lower cladding layer using the method of the invention. In step 200, photoresist layer 15 is spun on to the surface of core layer 14A. In step 300, the waveguide patterns are defined using standard lithography techniques. In step 400, cores 14 are formed with reactive ion etching (RIE) using standard etching techniques. In step 500, the residual photoresist material is removed. In step 600, the upper cladding layer 16 is formed using the method of the invention. The upper cladding layer substantially covers the core structure.

Figure 3:
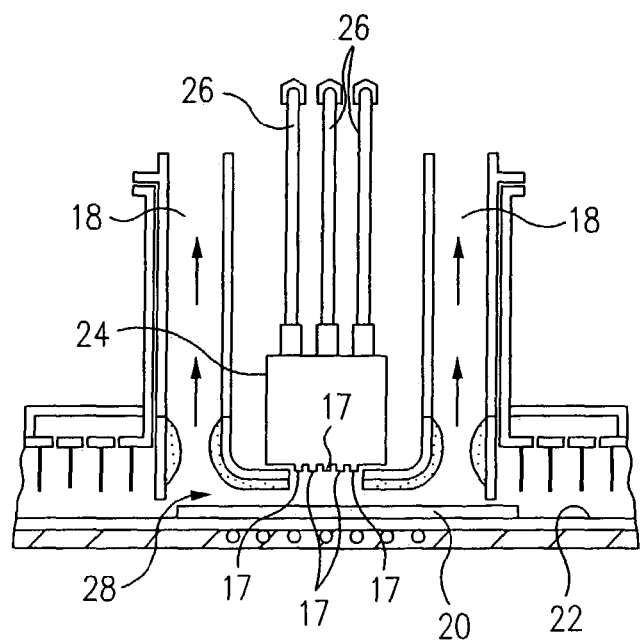
FIG. 3 is a cross sectional view of a linear injector apparatus.

FIG. 3 shows an apparatus that may be used to perform the method of the current invention. Wafer 20 is moved through reaction chamber 28 by conveyer 22. The conveyer 22 may include a heating element which heats the wafer (not shown). For example, the wafer may be heated to approximately 500° C. Alternately, other methods may be used to heat the wafer. The wafer is heated in order to allow the raw materials to react on the surface of the wafer to form the necessary layers.

Raw material source lines 26 (which may transport TEOS, dopant source materials such as TMOG, TMPi, MEPo, TMB, and TEB, or oxidizing agents) transport the raw materials to the linear injector 24. The oxidizing agent used in the process is typically an $O_2/O_3$ mixture; for example, 30 g/m$^3$ of $O_3$ in $O_2$. The raw materials are transported through one or more injection ports 17 toward heated wafer 20. When the materials reach the heated wafer, they react with the surface material and form a layer on the surface. The linear injector does not provide raw materials to the entire surface of the wafer at one time; instead the raw materials are provided over an exposure area that depends on the geometry of the injector and the distance between the injector ports and the wafer. The entire surface of the wafer passes through the exposure area as the wafer 20 is moved through the reaction chamber 28 on the conveyer 22.

By-products of the reaction and unreacted gases may be removed from the chamber 28 through exhaust ports 18 positioned on either side of the injector 24.

Figure 4:
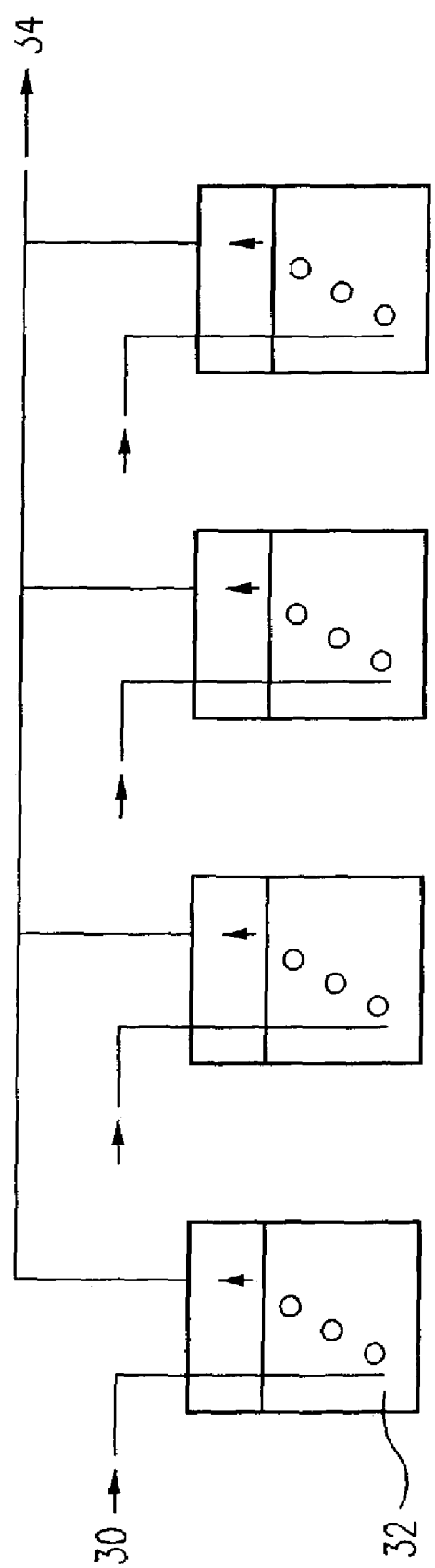
FIG. 4 illustrates the method by which materials are transported to the linear injector.
Figure 5:
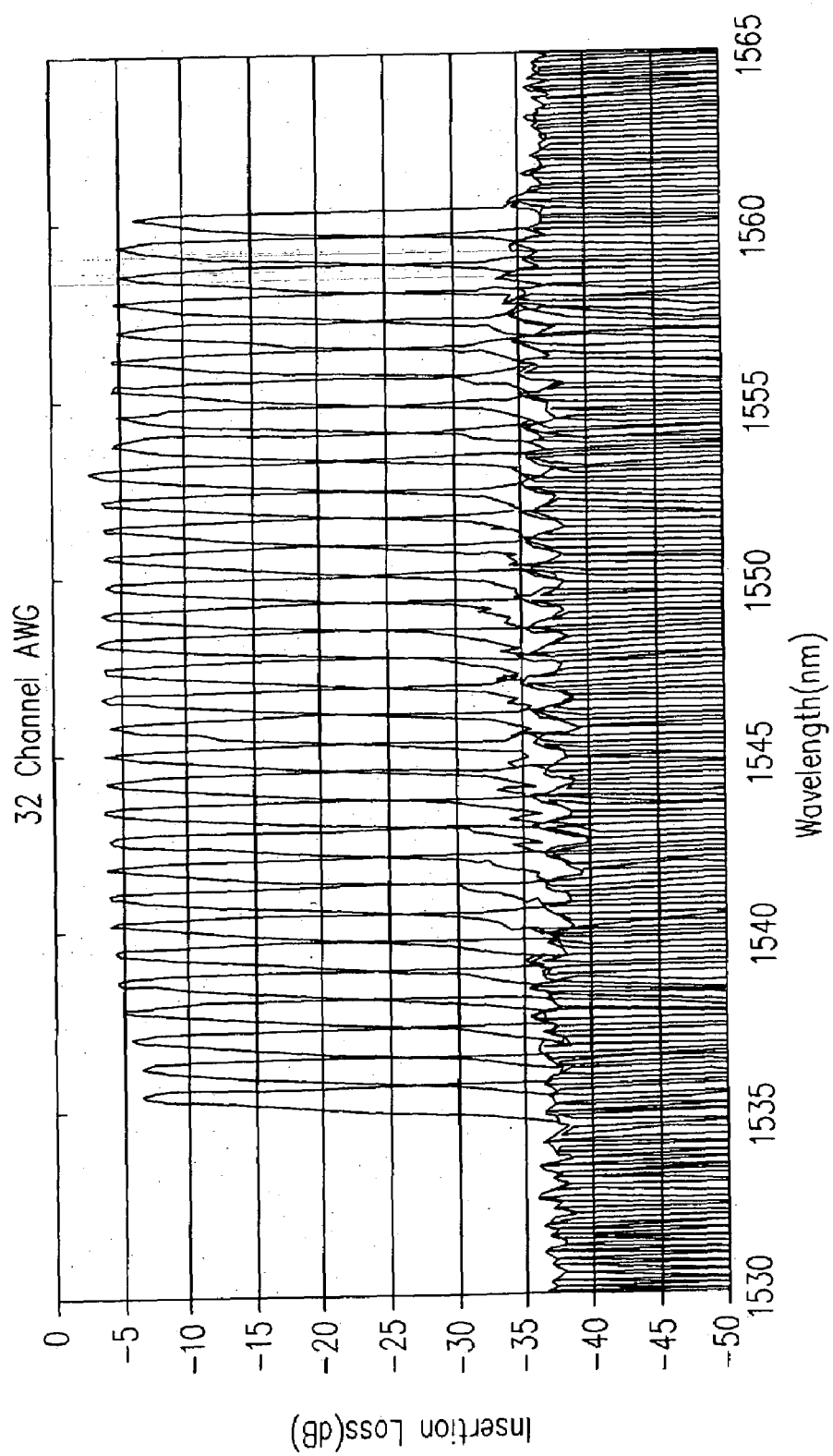
FIG. 5 is a graph of insertion loss versus wavelength for a 32 channel Array Waveguide Grating (AWG) formed using the described method.

FIG. 4 illustrates the method by which raw materials such as TEOS may be transported to the linear injector. Carrier gas 30, for example nitrogen, enters the bubbler 32 which contains the desired material; for example, TEOS. As the carrier gas passes through the material it creates bubbles containing the vapor of the material. A mixture 34 of carrier gas and vapor of one or more desired materials flows into the linear injector and then mixes with oxidizing agents. By adjusting and controlling the carrier gas flow rates to the bubblers, the amount of vapor for each material can be precisely maintained. The following formula is used to calculate the amount of each material fed into the linear injector:

$$n=[P_v/(760-P_v)]\times(f/22.4)$$

Where n=the number of moles per minute of the material fed into the linear injector, $P_v$=vapor pressure of the material in torr, and f=the carrier gas flow rate in standard liters per minute.

Additional bubblers 35 may be used to provide additional materials, for example they may hold the source materials for one or more dopants.

EXAMPLE

The method of the invention was performed in the following manner. A silicon wafer with an oxide lower cladding layer was provided. A core layer of $SiO_2$ doped with 8 wt % $P_2O_5$ was then formed using the method described above. The waveguide structure was patterned using standard photolithography and RIE techniques. Then an upper cladding layer covering the core structure was formed using $SiO_2$ doped with 2 wt % $P_2O_5$ and 5 wt % $B_2O_3$.

The loss values for waveguides produced using this method were 0.1 dB/cm for straight waveguides and 0.25 dB/cm for curved waveguides.

Additionally, array waveguide grating devices for wavelength division multiplexing and demultiplexing applications have been fabricated using this method. They exhibited less than 6 dB loss and approximately 30 dB cross talk. FIG. 6 shows a graph of insertion loss versus wavelength for a 32 channel Array Waveguide Grating (AWG) formed using the described method.

The preceding example illustrates one embodiment of the invention. Other embodiments of the invention can be used as well. For example, good results were obtained using $SiO_2$ doped with 7–9 wt % $P_2O_5$ for the core layer and $SiO_2$ doped with 1–2 wt % $P_2O_5$ and 3–5 wt % $B_2O_3$ for the upper cladding layer.

The above-described embodiments of the present invention are merely meant to be illustrative and not limiting. It will thus be obvious to those skilled in the art that various changes and modifications may be made without departing from this invention in its broader aspects.

We claim:

1. A method for producing an optical waveguide device, comprising:
    providing a wafer comprising a wafer material positioned on a conveyer, said wafer providing a lower cladding material;
    providing a linear injector positioned to transport a layer formation material onto an exposure area, such that when said wafer is conveyed through said exposure area said layer formation material can form a layer on said wafer;
    forming a core layer on said lower cladding material by conveying said wafer on said conveyer through said exposure area while said linear injector transports a core layer formation material and a dopant source for the core layer formation material onto said exposure area at approximately atmospheric pressure;
    forming a core by etching said core layer; and forming an upper cladding layer on said core region by conveying said wafer on said conveyer through said exposure area while said linear injector transports an upper cladding layer formation material onto said exposure area at approximately atmospheric pressure, such that said upper cladding layer substantially covers said core.

2. The method of claim 1 wherein the lower cladding material is a lower cladding layer on said wafer.

3. The method of claim 1 wherein the lower cladding material is the wafer material.

4. The method of claim 1, further comprising the step of heating the wafer.

5. The method of claim 1, wherein the core layer formation material includes TEOS.

6. The method of claim 1, wherein the core layer formation material includes TEPo.

7. The method of claim 1, wherein the core layer formation material includes TMPi.

8. The method of claim 1, wherein the core layer formation material includes TMOG.

9. The method of claim 1, wherein the core layer formation material includes an oxidizing agent.

10. The method of claim 1, wherein the upper cladding layer formation material includes TEOS.

11. The method of claim 1, wherein the upper cladding layer formation material includes TMPi.

12. The method of claim 1, wherein the upper cladding layer formation material includes TEPo.

13. The method of claim 1, wherein the upper cladding layer formation material includes TEB.

14. The method of claim 1, wherein the upper cladding layer formation material includes TMB.

15. The method of claim 1, wherein the upper cladding layer formation material includes an oxidizing agent.

16. The method of claim 1 wherein the dopant source is selected from a group consisting of: $B_2O_3$, $P_2O_5$, $GeO_2$, and $TiO_2$.

17. The method of claim 1 wherein said linear injector transports a dopant source for the upper cladding layer formation material onto said exposure area along with the upper cladding layer formation material.

* * * * *